(12) United States Patent
Wittkopp et al.

(10) Patent No.: US 8,496,556 B2
(45) Date of Patent: **\*Jul. 30, 2013**

(54) MULTI-SPEED TRANSMISSION

(75) Inventors: Scott H. Wittkopp, Ypsilanti, MI (US); Andrew W. Phillips, Rochester, MN (US); James M. Hart, Belleville, MI (US); Edward W. Mellet, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 158 days.

This patent is subject to a terminal disclaimer.

(21) Appl. No.: 12/987,735

(22) Filed: Jan. 10, 2011

(65) Prior Publication Data

US 2012/0178580 A1 Jul. 12, 2012

(51) Int. Cl.
*F16H 3/44* (2006.01)
(52) U.S. Cl.
USPC ........................................................ 475/269
(58) Field of Classification Search
USPC ................ 475/275, 276, 279, 280, 290, 291, 475/330
See application file for complete search history.

(56) References Cited

U.S. PATENT DOCUMENTS

| | | | |
|---|---|---|---|
| 6,176,803 B1 * | 1/2001 | Meyer et al. | 475/286 |
| 6,984,187 B2 | 1/2006 | Biermann | |
| 8,079,932 B2 * | 12/2011 | Phillips et al. | 475/280 |
| 2007/0072732 A1 * | 3/2007 | Klemen | 475/280 |
| 2009/0017971 A1 * | 1/2009 | Phillips et al. | 475/276 |
| 2012/0178579 A1 * | 7/2012 | Hart et al. | 475/271 |

* cited by examiner

*Primary Examiner* — Justin Holmes
*Assistant Examiner* — David J Hlavka

(57) ABSTRACT

A transmission includes an input and output member, four planetary gear sets each having first, second and third members, five interconnecting members continuously interconnecting members of the four planetary gear sets and six torque transmitting mechanisms selectively engageable to interconnect one of the first members, second members, and third members with at least one of another of the first members, second members, third members, and a stationary member. The torque transmitting mechanisms are selectively engageable in combinations of at least two to establish at least nine forward speed ratios and at least one reverse speed ratio between the input member and the output member.

19 Claims, 2 Drawing Sheets

| GEAR STATE | TORQUE TRANSMITTING MECHANISMS ||||||
|---|---|---|---|---|---|---|
| | 24 | 26 | 28 | 30 | 32 | 34 |
| REV | X | | | X | | |
| N | | | | O | | |
| 1ST | | X | | X | | |
| 2ND | | | | X | | X |
| 3RD | | X | | | | X |
| 4TH | | | X | | | X |
| 5TH | X | | | | | X |
| 6TH | | | | | X | X |
| 7TH | X | | | | X | |
| 8TH | | | X | | X | |
| 9TH | | X | | | X | |

X = ON - ENGAGED CARRYING TORQUE
O = ON - ENGAGED NOT CARRYING TORQUE

FIG. 3

MULTI-SPEED TRANSMISSION

FIELD

The invention relates generally to a multiple speed transmission having a plurality of planetary gear sets and a plurality of torque transmitting mechanisms, and more particularly to a transmission having nine speeds, four planetary gear sets and a plurality of torque transmitting mechanisms.

BACKGROUND

The statements in this section merely provide background information related to the present disclosure and may or may not constitute prior art.

A typical multiple speed transmission uses a combination of friction clutches or brakes, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, first, second, third and fourth planetary gear sets each having first, second and third members, a first interconnecting member continuously interconnecting the second member of the first planetary gear set with the second member of the second planetary gear set, a second interconnecting member continuously interconnecting the third member of the first planetary gear set with the third member of the second planetary gear set, a third interconnecting member continuously interconnecting the first member of the third planetary gear set with the first member of the fourth planetary gear set, a fourth interconnecting member continuously interconnecting the second member of the third planetary gear set with the second member of the fourth planetary gear set, a fifth interconnecting member continuously interconnecting the third member of the second planetary gear set with the first member of the third planetary gear set and six torque transmitting mechanisms each selectively engageable to interconnect one of the first members, second members, and third members with at least one of another of the first members, second members, third members, and a stationary member. The torque transmitting mechanisms are selectively engageable in combinations of at least two to establish at least nine forward speed ratios and at least one reverse speed ratio between the input member and the output member.

In another example of the present invention, the input member is continuously interconnected with the first member of the first planetary gear set and the output member is continuously interconnected with at least one of the second member of the third planetary gear set and the second member of the fourth planetary gear set.

In yet another example of the present invention, a first of the six torque transmitting mechanisms is selectively engageable to interconnect the first member of the second planetary gear set with the stationary member.

In yet another example of the present invention, a second of the six torque transmitting mechanisms is selectively engageable to interconnect at least one of the second member of the first planetary gear set and the second member of the second planetary gear set with the stationary member.

In yet another example of the present invention, a third of the six torque transmitting mechanisms is selectively engageable to interconnect at least one of the third member of the first planetary gear set, the third member of the second planetary gear set, the first member of the third planetary gear set and the first member of the fourth planetary gear set with the stationary member.

In yet another example of the present invention, a fourth of the six torque transmitting mechanisms is selectively engageable to interconnect the third member of the third planetary gear set with the stationary member.

In yet another example of the present invention, a fifth of the six torque transmitting mechanisms is selectively engageable to interconnect the third member of the third planetary gear set with the input member.

In yet another example of the present invention, a sixth of the six torque transmitting mechanisms is selectively engageable to interconnect the third member of the fourth planetary gear set with the input member.

In yet another example of the present invention, each of the first members are sun gear members, each of the second members are planet carrier members and each of the third members are ring gear members.

Further features and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting mechanisms in each of the available forward and reverse speeds or gear ratios of the transmission illustrated in FIGS. 1 and 2.

DETAILED DESCRIPTION

The following description is merely exemplary in nature and is not intended to limit the present disclosure, application, or uses.

At the outset, it should be appreciated that in the particular examples provided, the automatic transmissions of the present invention have an arrangement of permanent mechanical connections between the elements of the four planetary gear sets. For example, a first component or element of a first planetary gear set is permanently coupled to a first component or element of a second planetary gear set. A second component or element of the first planetary gear set is permanently coupled to a second component or element of the second planetary gear set. A first component or element of a third planetary gear set is permanently coupled to a first component or element of a fourth planetary gear set. A second component or element of a third planetary gear set is permanently coupled to a second component or element of a fourth planetary gear set. Finally, the second component or element of the second planetary gear set is permanently coupled to the second component or element of the third planetary gear set.

Figure 1:
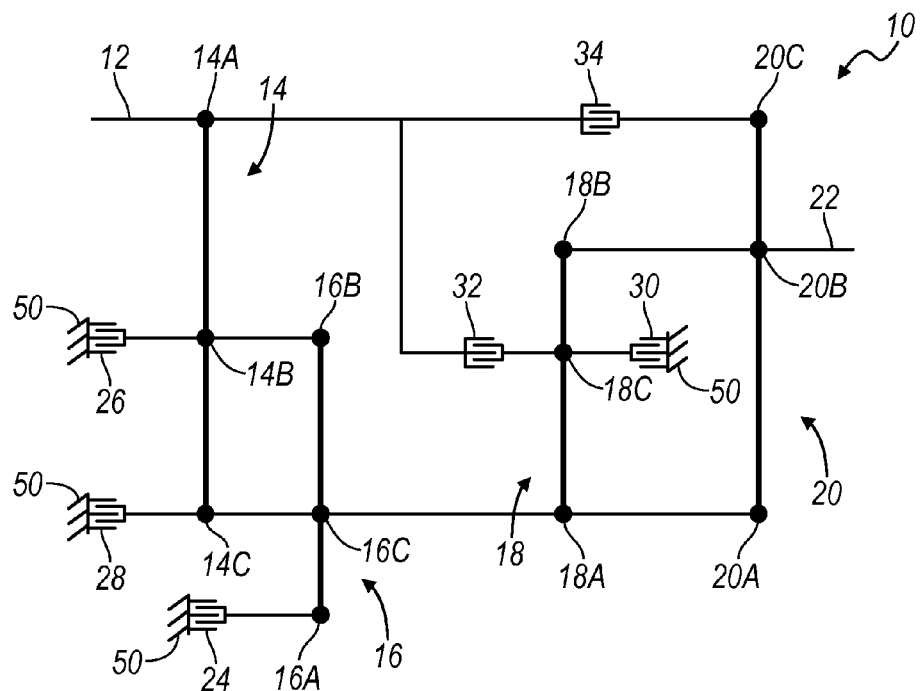
FIG. 1 is a lever diagram of an embodiment of a nine speed transmission according to the present invention.

Referring now to FIG. 1, an example of a nine speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22.

The input shaft or member 12 is coupled to the first node 14A of the first planetary gear set 14. The second node 14B of the first planetary gear set 14 is coupled to the second node 16B of the second planetary gear set 16. The third node 14C of the first planetary gear set 14 is coupled to the third node 16C of the second planetary gear set 16. The third node 16C of the second planetary gear set 16 is coupled to the first node 18A of the third planetary gear set 18. The second node 18B of the third planetary gear set 18 is coupled to the second node 20B of the third planetary gear set 18. The first node 18A of the third planetary gear set 18 is coupled to the first node 20A of the fourth planetary gear set 20. The output shaft or member 22 is coupled to the second node 18B of the third planetary gear set 18 and the second node 20B of the fourth planetary gear set 20.

A first brake 24 selectively connects the first node 16A of the second planetary gear set 16 with a stationary member 50. A second brake 26 selectively connects the second node 14B of the first planetary gear set 14 with the stationary member 50. A third brake 28 selectively connects the third node 14C of the first planetary gear set 14 with the stationary member 50. A fourth brake 30 selectively connects the third node 18C of the third planetary gear set 18 with the stationary member 50. A first clutch 32 selectively connects the third node 18C of the third planetary gear set 18 with the input shaft or member 12. A second clutch 34 selectively connects the third node 20C of the fourth planetary gear set 20 with the input shaft or member 12.

Figure 2:
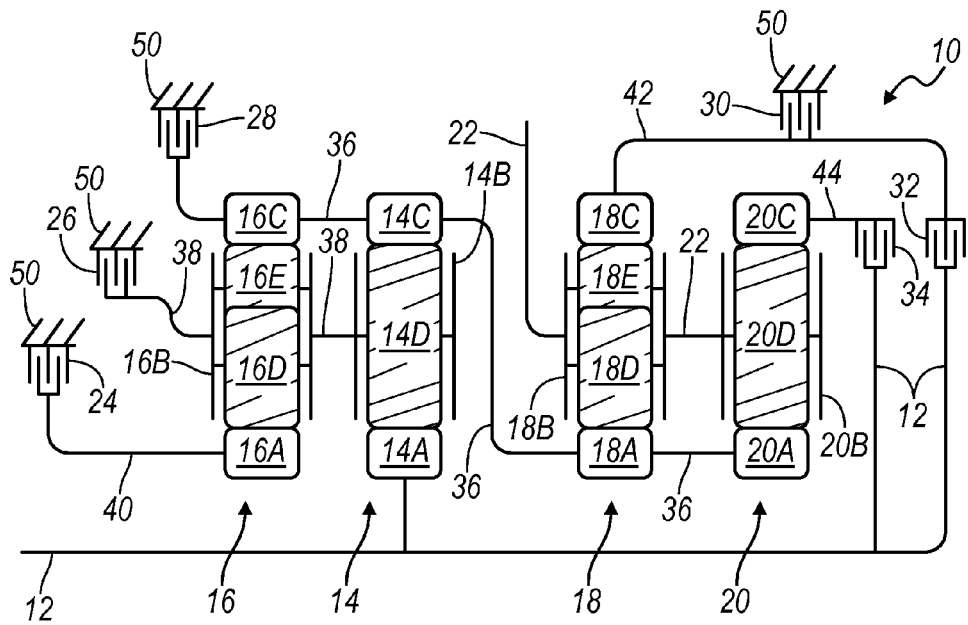
FIG. 2 is a diagrammatic view of an embodiment of a nine speed transmission according to the present invention.

Referring now to FIG. 2, a stick diagram presents a schematic layout of the embodiment of the nine speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the first planetary gear set 14 of transmission 10, includes a sun gear member 14A, a ring gear member 14C, and a planet gear carrier member 14B that rotatably supports a set of planet gears 14D (only one of which is shown). The sun gear member 14A is connected for common rotation with the input member or shaft 12. The ring gear member 14C is connected for common rotation with a first shaft or interconnecting member 36. The planet gear carrier member 14B is connected for common rotation with a second shaft or interconnecting member 38. The planet gears 14D are each configured to intermesh with both of the sun gear member 14A and the ring gear member 14C.

The second planetary gear set 16 of transmission 10 includes the sun gear member 16A, a ring gear member 16C, and a planet gear carrier member 16B that rotatably supports a first set of planet gears 16D and a second set of planet gears 16E (only one of each set is shown). The sun gear member 16A is connected for common rotation with a third shaft or interconnecting member 40. The ring gear member 16C is connected for common rotation with the first shaft or interconnecting member 36. The planet carrier member 16B is connected for common rotation with the second shaft or interconnecting member 38. The planet gears 16D are each configured to intermesh with both of the sun gear member 16A and the planet gears 16E. The planet gears 16E are each configured to intermesh with both the planet gears 16D and the ring gear member 16C.

The third planetary gear set 18 of transmission 10 includes a sun gear member 18A, a ring gear member 18C, and a planet gear carrier member 18B that rotatably supports a first set of planet gears 18D and a second set of planet gears 18E (only one of each set is shown). The sun gear member 18A is connected for common rotation with the first shaft or interconnecting member 36. The ring gear member 18C is connected for common rotation with a fourth shaft or interconnecting member 42. The planet carrier member 18B is connected for common rotation with the output shaft or member 22. The planet gears 18D are each configured to intermesh with both of the sun gear member 18A and the planet gears 18E. The planet gears 18E are each configured to intermesh with both the planet gears 18D and the ring gear member 18C.

The fourth planetary gear set 20 of transmissions 10 includes a sun gear member 20A, a ring gear member 20C, and a planet gear carrier member 20B that rotatably supports a set of planet gears 120D (only one of which is shown). The sun gear member 20A is connected for common rotation with the first shaft or interconnecting member 36. The ring gear member 20C is connected for common rotation with a fifth shaft or interconnecting member 44. The planet carrier member 20B is connected for common rotation with the output shaft or member 22. The planet gears 20D are each configured to intermesh with both of the sun gear member 20A and the ring gear member 20C.

The input shaft or member 12 is preferably continuously connected to an engine (not shown) or to a turbine of a torque converter (not shown). The output shaft or member 22 is preferably continuously connected with the final drive unit or transfer case (not shown).

The torque transmitting mechanisms or brakes 24, 26, 28, 30 and clutches 32, 34 allow for selective interconnection of the shafts or interconnecting members, members of the planetary gear sets and the housing. For example, a first brake 24 is selectively engageable to interconnect the third shaft or interconnecting member 40 with a stationary member or transmission housing 50. A second brake 26 is selectively engageable to interconnect the second shaft or interconnecting member 38 with the stationary member or transmission housing 50. A third brake 28 is selectively engageable to interconnect the first shaft or interconnecting member 36 with the stationary member or transmission housing 50. A fourth brake 30 is selectively engageable to interconnect the fourth shaft or interconnecting member 42 with the stationary member or transmission housing 50. A first clutch 32 is selectively engageable to interconnect the fourth shaft or interconnecting member 42 with the input shaft or member 12. The second clutch 34 is selectively engageable to interconnect the fifth shaft or interconnecting member 44 with the input shaft or member 12.

Referring now to FIGS. 2 and 3, the operation of the embodiment of the nine speed transmission 10 will be described. It will be appreciated that the transmission 10 is capable of transmitting torque from the input shaft or member 12 to the output shaft or member 22 in at least nine forward speed or torque ratios and at least one reverse speed or torque ratio. Each forward and reverse speed or torque ratio is attained by engagement of one or more of the torque transmitting mechanisms (i.e. first brake 24, second brake 26, third brake 28, fourth brake 30, first clutch 32, and second clutch 34), as will be explained below. FIG. 3 is a truth table presenting the various combinations of torque transmitting mechanisms that are activated or engaged to achieve the various gear states. Gear ratios are achievable depending on the gear diameter, gear teeth count and gear configuration selected.

To establish reverse gear, the first brake 24 and the fourth brake 30 are engaged or activated. The first brake 24 connects the third shaft or interconnecting member 40 with the stationary member or transmission housing 50 in order to prevent the third shaft or interconnecting member 40 and therefore the sun gear member 16A of the second planetary gear set 16 from rotating relative to the transmission housing 50. The fourth brake 30 connects the fourth shaft or interconnecting member 42 with the stationary member or transmission housing 50 in order to prevent the fourth shaft or interconnecting member 42 and therefore the ring gear member 18C of the third planetary gear set 18 from rotating relative to the transmission housing 50. Likewise, the nine forward ratios are achieved through different combinations of clutch and brake engagement, as shown in FIG. 5.

It will be appreciated that the foregoing explanation of operation and gear states of the nine speed transmission 10 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
   an input member;
   an output member;
   first, second, third and fourth planetary gear sets each having first, second and third members, wherein the output member is directly connected with at least one of the second member of the third planetary gear set and the second member of the fourth planetary gear set;
   a first interconnecting member continuously interconnecting the second member of the first planetary gear set with the second member of the second planetary gear set;
   a second interconnecting member continuously interconnecting the third member of the first planetary gear set with the third member of the second planetary gear set;
   a third interconnecting member continuously interconnecting the first member of the third planetary gear set with the first member of the fourth planetary gear set;
   a fourth interconnecting member continuously directly interconnecting the second member of the third planetary gear set with the second member of the fourth planetary gear set;
   a fifth interconnecting member continuously interconnecting the third member of the second planetary gear set with the first member of the third planetary gear set; and
   six torque transmitting mechanisms each selectively engageable to interconnect one of the first members, second members, and third members with at least one of another of the first members, second members, third members, and a stationary member, and
   wherein the torque transmitting mechanisms are selectively engageable in combinations of at least two to establish at least nine forward speed ratios and at least one reverse speed ratio between the input member and the output member.

2. The transmission of claim 1 wherein the input member is continuously interconnected with the first member of the first planetary gear set.

3. The transmission of claim 2 wherein a first of the six torque transmitting mechanisms is selectively engageable to interconnect the first member of the second planetary gear set with the stationary member.

4. The transmission of claim 3 wherein a second of the six torque transmitting mechanisms is selectively engageable to interconnect at least one of the second member of the first planetary gear set and the second member of the second planetary gear set with the stationary member.

5. The transmission of claim 4 wherein a third of the six torque transmitting mechanisms is selectively engageable to interconnect at least one of the third member of the first planetary gear set, the third member of the second planetary gear set, the first member of the third planetary gear set and the first member of the fourth planetary gear set with the stationary member.

6. The transmission of claim 5 wherein a fourth of the six torque transmitting mechanisms is selectively engageable to interconnect the third member of the third planetary gear set with the stationary member.

7. The transmission of claim 6 wherein a fifth of the six torque transmitting mechanisms is selectively engageable to interconnect the third member of the third planetary gear set with the input member.

8. The transmission of claim 7 wherein a sixth of the six torque transmitting mechanisms is selectively engageable to interconnect the third member of the fourth planetary gear set with the input member.

9. The transmission of claim 8 wherein each of the first members are sun gear members, each of the second members are planet carrier members and each of the third members are ring gear members.

10. A transmission comprising:
    an input member;
    an output member;
    first, second, third and fourth planetary gear sets each having first, second and third members wherein the input member is continuously interconnected with the first member of the first planetary gear set and the output member is directly connected with at least one of the second member of the third planetary gear set and the second member of the fourth planetary gear set;

a first interconnecting member continuously interconnecting the second member of the first planetary gear set with the second member of the second planetary gear set;

a second interconnecting member continuously interconnecting the third member of the first planetary gear set with the third member of the second planetary gear set;

a third interconnecting member continuously interconnecting the first member of the third planetary gear set with the first member of the fourth planetary gear set;

a fourth interconnecting member continuously directly interconnecting the second member of the third planetary gear set with the second member of the fourth planetary gear set;

a fifth interconnecting member continuously interconnecting the third member of the second planetary gear set with the first member of the third planetary gear set; and six torque transmitting mechanisms each selectively engageable to interconnect one of the first members, second members, and third members with at least one of another of the first members, second members, third members, and a stationary member, and wherein the torque transmitting mechanisms are selectively engageable in combinations of at least two to establish at least nine forward speed ratios and at least one reverse speed ratio between the input member and the output member.

11. The transmission of claim 10 wherein a first of the six torque transmitting mechanisms is selectively engageable to interconnect the first member of the second planetary gear set with the stationary member.

12. The transmission of claim 11 wherein a second of the six torque transmitting mechanisms is selectively engageable to interconnect at least one of the second member of the first planetary gear set and the second member of the second planetary gear set with the stationary member.

13. The transmission of claim 12 wherein a third of the six torque transmitting mechanisms is selectively engageable to interconnect at least one of the third member of the first planetary gear set, the third member of the second planetary gear set, the first member of the third planetary gear set and the first member of the fourth planetary gear set with the stationary member.

14. The transmission of claim 13 wherein a fourth of the six torque transmitting mechanisms is selectively engageable to interconnect the third member of the third planetary gear set with the stationary member.

15. The transmission of claim 14 wherein a fifth of the six torque transmitting mechanisms is selectively engageable to interconnect the third member of the third planetary gear set with the input member.

16. The transmission of claim 15 wherein a sixth of the six torque transmitting mechanisms is selectively engageable to interconnect the third member of the fourth planetary gear set with the input member.

17. The transmission of claim 16 wherein each of the first members are sun gear members, each of the second members are planet carrier members and each of the third members are ring gear members.

18. A transmission comprising:
an input member;
an output member;
first, second, third and fourth planetary gear sets each having first, second and third members wherein the input member is continuously interconnected with the first member of the first planetary gear set and the output member is directly connected with at least one of the second member of the third planetary gear set and the second member of the fourth planetary gear set;

a first interconnecting member continuously interconnecting the second member of the first planetary gear set with the second member of the second planetary gear set;

a second interconnecting member continuously interconnecting the third member of the first planetary gear set with the third member of the second planetary gear set;

a third interconnecting member continuously interconnecting the first member of the third planetary gear set with the first member of the fourth planetary gear set;

a fourth interconnecting member continuously directly interconnecting the second member of the third planetary gear set with the second member of the fourth planetary gear set;

a fifth interconnecting member continuously interconnecting the third member of the second planetary gear set with the first member of the third planetary gear set;

a first torque transmitting mechanism selectively engageable to interconnect the first member of the second planetary gear set with a stationary member;

a second torque transmitting mechanism selectively engageable to interconnect at least one of the second member of the first planetary gear set and the second member of the second planetary gear set with the stationary member;

a third torque transmitting mechanism selectively engageable to interconnect at least one of the third member of the first planetary gear set, the third member of the second planetary gear set, the first member of the third planetary gear set and the first member of the fourth planetary gear set with the stationary member;

a fourth torque transmitting mechanism selectively engageable to interconnect the third member of the third planetary gear set with the stationary member;

a fifth torque transmitting mechanism selectively engageable to interconnect the third member of the third planetary gear set with the input member; and a sixth torque transmitting mechanisms is selectively engageable to interconnect the third member of the fourth planetary gear set with the input member, and wherein the torque transmitting mechanisms are selectively engageable in combinations of at least two to establish at least nine forward speed ratios and at least one reverse speed ratio between the input member and the output member.

19. The transmission of claim 18 wherein each of the first members are sun gear members, each of the second members are planet carrier members and each of the third members are ring gear members.

* * * * *